(12) United States Patent
Kodaypak et al.

(10) Patent No.: US 9,900,761 B2
(45) Date of Patent: Feb. 20, 2018

(54) SYSTEM AND METHOD FOR DIRECT TUNNELING IN POINT-TO-MULTIPOINT MOBILE SERVICE

(71) Applicant: AT&T Intellectual Property I, LP, Atlanta, GA (US)

(72) Inventors: Rajendra Prasad Kodaypak, Sammamish, WA (US); Ryan Redfern, Cerritos, CA (US); Jiansong Wang, Parlin, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 262 days.

(21) Appl. No.: 14/696,585

(22) Filed: Apr. 27, 2015

(65) Prior Publication Data

US 2016/0316351 A1    Oct. 27, 2016

(51) Int. Cl.
| | | |
|---|---|---|
| *H04W 8/00* | (2009.01) | |
| *H04W 4/06* | (2009.01) | |
| *H04L 12/46* | (2006.01) | |
| *H04W 12/04* | (2009.01) | |
| *H04W 68/00* | (2009.01) | |

(Continued)

(52) U.S. Cl.
CPC ......... *H04W 8/005* (2013.01); *H04L 12/4633* (2013.01); *H04W 4/06* (2013.01); *H04W 68/005* (2013.01); *H04L 29/06455* (2013.01); *H04W 12/04* (2013.01); *H04W 12/06* (2013.01)

(58) Field of Classification Search
CPC ..... H04W 8/005; H04W 68/005; H04W 4/06; H04L 12/06; H04L 12/04; H04L 12/4633
See application file for complete search history.

(56) References Cited

U.S. PATENT DOCUMENTS

| | | | |
|---|---|---|---|
| 6,496,694 B1 * | 12/2002 | Menon | H04W 88/08 455/424 |
| 8,165,054 B2 | 4/2012 | Becker et al. | |
| 8,249,018 B2 | 8/2012 | Gonsa et al. | |

(Continued)

OTHER PUBLICATIONS

Na, Jee-Hyeon et al., "A novel single-cell transmission scheme for multicast services in LTE-advanced", Information Networking (ICOIN), 2014 International Conference on. IEEE, 2014.

(Continued)

*Primary Examiner* — Rasheed Gidado
(74) *Attorney, Agent, or Firm* — Guntin & Gust, PLC; Matthew Tropper

(57) ABSTRACT

Aspects of the subject disclosure may include, for example, a device, process or software that receives data for distribution to a multiple mobile devices, wherein the distribution is via a data dissemination service. A request is sent to a core network element over a control signaling interface to establish a wireless bearer service. The wireless bearer service can be used to wirelessly distribute the data to the multiple mobile devices via a radio access node. A confirmation is received of the establishment of the wireless bearer service, and the mobile user service is announced over the wireless bearer service. The data is forwarded to the radio access node via a wireless terrestrial bearer of the wireless bearer service, wherein the radio access node wirelessly distributes the data to the number of mobile devices via the mobile user service over a common radio channel. Other embodiments are disclosed.

20 Claims, 8 Drawing Sheets

(51) Int. Cl.
*H04W 12/06* (2009.01)
*H04L 29/06* (2006.01)

(56) References Cited

U.S. PATENT DOCUMENTS

| | | | | |
|---|---|---|---|---|
| 8,379,657 | B2* | 2/2013 | Lim | H04W 76/021 370/395.2 |
| 8,867,388 | B2* | 10/2014 | Newberg | H04L 1/0003 370/252 |
| 8,909,239 | B2 | 12/2014 | Edge | |
| 9,191,865 | B1* | 11/2015 | Paczkowski | H04W 76/02 |
| 9,319,847 | B2* | 4/2016 | Chao | H04W 4/06 |
| 2004/0022218 | A1* | 2/2004 | Kim | H04L 12/1881 370/335 |
| 2011/0164542 | A1* | 7/2011 | Cai | H04B 7/155 370/312 |
| 2012/0263089 | A1 | 10/2012 | Gupta et al. | |
| 2013/0102343 | A1* | 4/2013 | Shaw | H04L 47/762 455/509 |
| 2013/0155871 | A1 | 6/2013 | Zhu et al. | |
| 2013/0215817 | A1 | 8/2013 | Lu et al. | |
| 2013/0279395 | A1* | 10/2013 | Aramoto | H04W 72/005 370/312 |
| 2013/0294320 | A1 | 11/2013 | Jactat et al. | |
| 2013/0340048 | A1* | 12/2013 | Sebastian | H04L 63/08 726/4 |
| 2014/0064177 | A1* | 3/2014 | Anchan | H04W 4/08 370/312 |
| 2014/0286222 | A1 | 9/2014 | Yu et al. | |
| 2015/0138987 | A1* | 5/2015 | Lee | H04L 65/608 370/238 |
| 2015/0201447 | A1* | 7/2015 | Li | H04W 36/0066 455/450 |

OTHER PUBLICATIONS

Samsung, eMBMS-with-Samsung-0, 2012.

* cited by examiner

PRIOR ART

100

200

SYSTEM AND METHOD FOR DIRECT TUNNELING IN POINT-TO-MULTIPOINT MOBILE SERVICE

FIELD OF THE DISCLOSURE

The subject disclosure relates to a system and method for direct tunneling in point-to-multipoint mobile service.

BACKGROUND

With increasingly widespread deployment of advanced wireless mobile networks, such as $3^{rd}$ Generation Partnership Project (3GPP) Long-Term Evolution (LTE) network architectures, these networks are replacing wired networks as the main access networks of choice. Wireless mobile networks continue to adapt to accommodate increased data traffic in view of radio spectrum, which remains a scarce resource and will continue do so for the foreseeable future. Video consumption, in particular, has grown to account for almost 50% of network traffic in cellular networks. Consequently, techniques that enable efficient use of the cellular spectrum and delivery of videos are invaluable to any cellular service provider.

Recent trends in wireless mobile networks are adopting point-to-multipoint services, in which data is transmitted from a single source entity to multiple recipients. Transmitting the same data to multiple recipients allows network resources, including the scarce radio spectrum, to be shared. One such example includes an LTE broadcast service, referred to as an evolved Multimedia Broadcast/Multicast service (eMBMS), disclosed in 3GPP TS 23.246, incorporated herein by reference in its entirety.

In particular, MBMS is a point-to-multipoint service providing a broadcast mode, in which a unidirectional point-to-multipoint transmission of data is established from a single source entity to all users in a broadcast service area. The MBMS also includes a multicast mode, in which a unidirectional point-to-multipoint transmission of data from a single source point to a multicast group in a multicast service area. Multicast mode can include a possibility for the network to selectively transmit to cells within the multicast service area which contain members of a multicast group.

FIG. 1 depicts an illustrative embodiment of reference architecture 100 to support the MBMS bearer service with eUTRAN and UTRAN. FIG. 1 was obtained from 3GPP TS 23.246. The wireless network 100 include radio access network (E-UTRAN) 102 that communicates wirelessly with mobile devices 104a. The reference architecture 100 includes a BM-SC 108, a Multimedia Broadcast/Multicast Service Gateway (MBMS GW) 110, a Mobility Management Entity (MME) 112, and a combined Packet Data Network (PDN) gateway 114.

The BM-SC 108 traditionally provides functions for MBMS user service provisioning and delivery. The BM-SC 108 issues session start request is provided on a SGmb diameter based interface. The MBMS-GW 110 traditionally provides an interface for entities using MBMS bearers through the SGi-mb (user plane) reference point and an interface for entities using MBMS bearers through the SGmb (control plane) reference point. The MBMS-GW 110 also traditionally facilitates IP multicast distribution of MBMS user plane data to E-UTRAN nodes (e.g., M1 reference points).

The MBMS-GW 110 responds to the BM-SC with session response. The MBMS-GW 110 then sends the session start request to a Mobility Management Entity (MME) on a Sm GTPv2-C based interface. The MME 112 then sends the session start request to the E-UTRAN 102 on an M3 Stream Control Transmission Protocol (SCTP) based interface. The E-UTRAN 102 sends the session start response to MME 112, which sends it to the MBMS GW 110.

In a traditional LTE-Broadcast network design, the BM-SC 108 initiates the session start request towards the MBMS-GW 110 on the SGmb diameter based interface to indicate the impending start of user data corresponding to a specific broadcast service. MBMS-GW 110 responds to the BM-SC 108 with session response. The MBMS-GW 110 then sends the session start request on the Sm interface to the MME 112. The MME 112 then sends the session start request on the M3 interface to the E-UTRAN 102. The E-UTRAN 102 sends the session start response to the MME 112, which will then send it to the MBMS GW 110.

There are 3 layers of control plane messaging with 3 different interfaces and protocol types used in establishing the MBMS session start request from the BM-SC to the eNBs. Upon successful establishment of the session and radio resource allocation, the eNB can join the transport network IP multicast address to receive the user data from MGW.

BRIEF DESCRIPTION OF THE DRAWINGS

Reference will now be made to the accompanying drawings, which are not necessarily drawn to scale, and wherein.

DETAILED DESCRIPTION

Figure 1:
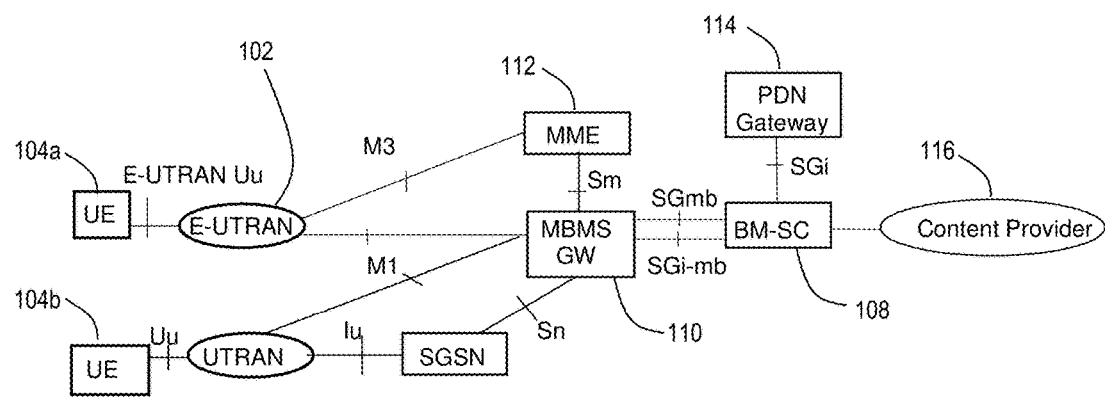
FIG. 1 depicts an illustrative functional block diagram of a portion of a prior art multicast/broadcast mobile network.

The subject disclosure presents a method to provide direct tunnel multicast over LTE that simplifies the eMBMS network architecture and solution design towards efficient control and user plane transport to reduce routing latency as well as to enhance overall service delivery. Other embodiments are described in the subject disclosure.

One or more aspects of the subject disclosure include collapsing MBMS-gateway (MBMS-GW) network element control plane, or signaling, functionality into one or more of a BM-SC or an MME over a General Packet Radio Service Tunneling (GTP) GTP v2-C interface established there between. Using the GTP v2-C protocol avoids an extra layer of messaging that would otherwise be required over diameter interface—a protocol that is complex enough for routing in case of peer network element failures or resource constrained situations at the nodal level. Consequently, an improvement is realized to the overall MBMS session and MBMS bearer context establishment phase.

Likewise, MBMS-GW user plane, or data handling, functionality is effectively collapsed into one or more of the BM-SC or the eNB, thereby eliminating a need for the MBMS-GW altogether. By collapsing the MBMS-GW user plane functionality into the BM-SC and/or the eNB, the network architecture can be simplified via direct M1 connectivity between an eNB and a BM-SC over an GTP v1-U interface established there between.

One embodiment of the subject disclosure includes a device having a processor and a memory that stores executable instructions, which when executed by the processor, facilitate performance of operations. The operations include receiving data for distribution to a multiple mobile devices, wherein the distribution is via a mobile user service. A request is sent to a mobility management entity over a control signaling interface to establish a wireless bearer service. The wireless bearer service can be used to distribute the data to the multiple mobile devices via one or more radio access nodes. A confirmation is received of the establishment of the wireless bearer service, and the mobile user service is announced over the wireless bearer service. The data is forwarded to a radio access node via a wireless terrestrial bearer of the wireless bearer service, wherein the radio access node wirelessly distributes the data to the number of mobile devices via the mobile user service over a common radio channel.

Another embodiment of the subject disclosure includes a process that includes receiving data for distribution to a number of mobile devices, wherein the distribution is via a data dissemination service. A request is sent to a core network node over a control signaling interface for establishment of a wireless bearer service to wirelessly distribute the data to the number of mobile devices via one or more radio access nodes. The establishment of a wireless bearer service is confirmed and the data is forwarded to a radio access node via a wireless terrestrial bearer of the wireless bearer service. The radio access node wirelessly distributes the data to the number of mobile devices via the data dissemination service over a common radio channel.

Yet another embodiment of the subject disclosure includes a machine-readable storage medium, having executable instructions that, when executed by a processor, facilitate performance of operations. The operations include receiving data for distribution to a number of mobile devices. A request is sent to a network control node for establishment of a wireless bearer service to wirelessly distribute the data to the number of mobile devices via one or more radio access nodes. A confirmation is received of the establishment of the wireless bearer service and the data is forwarded to a radio access node via the wireless terrestrial bearer of the wireless bearer service. The radio access node wirelessly distributes the data to the number of mobile devices over a common radio channel.

This disclosure provides a method to establish the MBMS session over the control plane directly from the BM-SC to the MME on the Sm interface. This is achieved by collapsing the control plane part of the MBMS GW into the MME and BM-SC so that these two nodes can directly interface with each other to simplify the network transmission path, control plane routing across the underlying transport network and speed up the overall control plane establishment process. The user plane data transport could be optimized with direct tunnel multicast from BM-SC to the eNB as a result of collapsing the user plane functionality into eNB and BM-SC.

Figure 2:
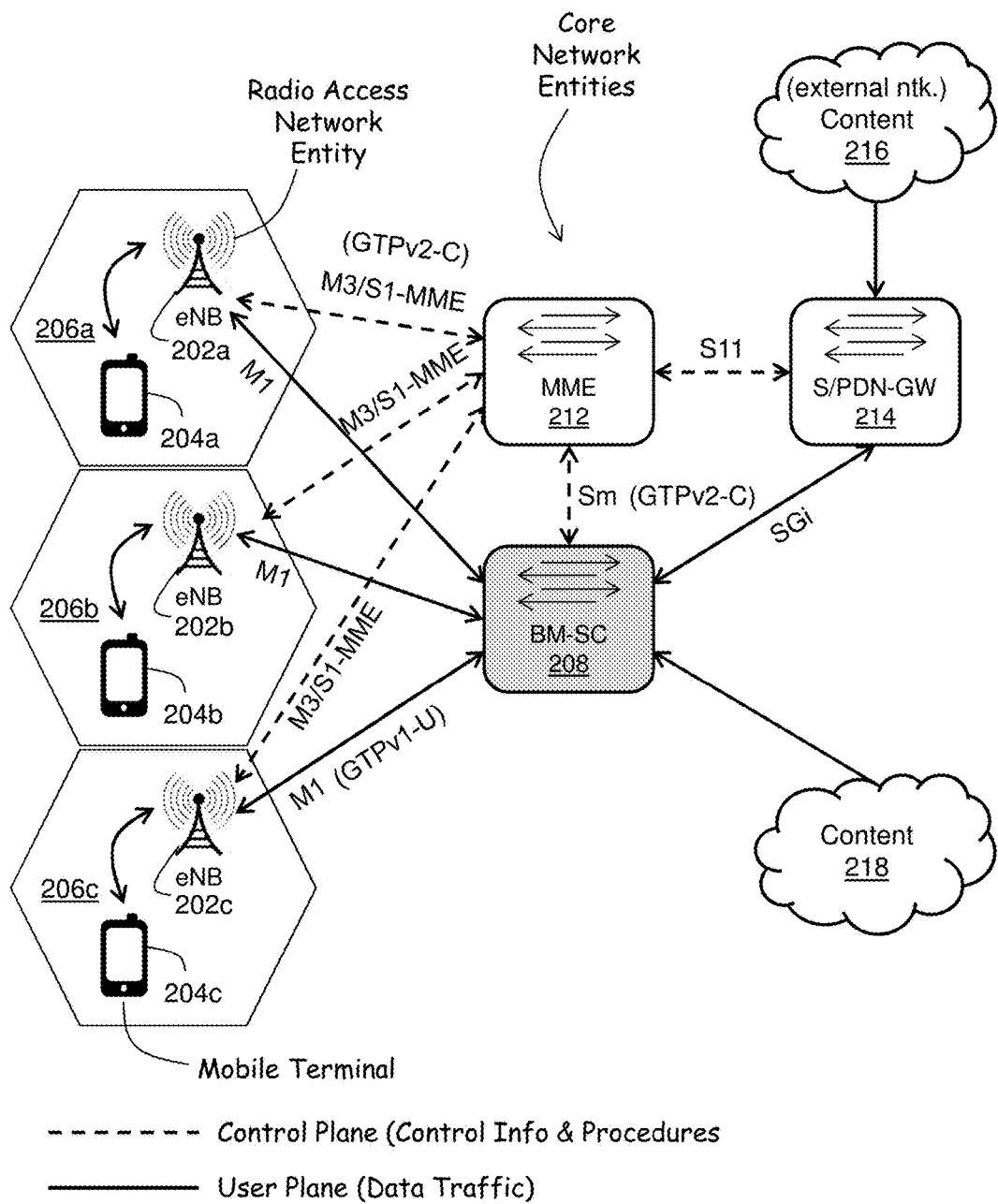
FIG. 2 depicts an illustrative embodiment of a portion of a multicast/broadcast mobile network.

Referring to FIG. 2 an illustrative embodiment of a portion of a point-to-multipoint service network 200, sometimes referred to as a multicast/broadcast mobile network 200. In particular, the multicast/broadcast mobile network 200 provides a direct tunnel capability. The wireless network 200 may include a number of eNBs 202a . . . 202c, generally 202, and other network entities. An eNB 202 may be a station that communicates wirelessly with mobile devices 204a . . . 204c, generally 204. Each eNB 202 can provide communication coverage for a particular geographic area 206a . . . 206c, generally 206. The network 200 also includes a BM-SC 208, at least one MME 212, and a combined S/PDN-GW 214. In an LTE network, the term "cell" can refer to a coverage area of an eNB and/or an eNB subsystem serving this coverage area.

An eNB 202 can provide communication coverage for a macro cell, a pico cell, a femto cell, and/or other types of cells. A macro cell may cover a relatively large geographic area (e.g., several kilometers in radius) and may allow unrestricted access by mobile devices 204, sometimes referred to as User Equipment (UE). A pico cell may cover a relatively small geographic area and may allow unrestricted access by UEs 204. A femto cell may cover a relatively small geographic area (e.g., a home or business) and may allow restricted access by UEs 204 having association with the femto cell. In general, an eNB can support one or multiple cells.

The wireless network 200 can be a heterogeneous network that includes eNBs of different types, e.g., macro eNBs, pico eNBs, femto eNBs, relays, etc. These different types of eNBs can have different transmit power levels, different coverage areas, and different impact on interference in the wireless network 200. For example, macro eNBs can have a high transmit power level (e.g., about 20 Watts) whereas pico eNBs and femto eNBs may have a lower transmit power level (e.g., about 1 Watt or less depending on indoor/outdoor cells and their coverage area).

The wireless network 200 can support synchronous or asynchronous operation. For synchronous operation, the eNBs 202 can have similar frame timing, and transmissions from different eNBs 202 may be approximately aligned in time. For asynchronous operation, the eNBs 202 can have different frame timing, and transmissions from different eNBs 202 may not be aligned in time. The techniques described herein may be used for both synchronous and asynchronous operation.

The eNBs 202 can also communicate with one another, e.g., directly or indirectly via wireless or a backhaul network (not shown). The backhaul network can be a private network, e.g., owned, operated, and/or leased on behalf of a wireless communication service provider. Alternatively or in addition, the backhaul network can be a public network, such as a packet switched network, e.g., the Internet, or a circuit-switched network. The backhaul network can include one or more of wireline connectivity, fiber optic connectivity, and wireless connectivity. Wireless connectivity can include, without limitation, one or more of a terrestrial radio link, a microwave link, a free-space optical link, a satellite link, and so on.

The UEs 204 can be dispersed throughout the wireless network 200, and each UE 204 may be stationary or mobile. A UE 204 can also be referred to as a terminal, a mobile station, a subscriber unit, a station, mobile entity, or other terminology. A UE 204 can be a cellular phone, a personal digital assistant (PDA), a wireless modem, a wireless communication device, a handheld device, a laptop computer, a cordless phone, or other mobile entities, such as a vehicle. In some embodiments, the UE 204 can include otherwise fixed or stationary equipment, such as a media processor or set-top box, a web-enabled appliance, a utility meter, and the like. A UE 204 can be able to communicate with the eNBs 202, whether macro eNBs, pico eNBs, femto eNBs, or other network entities.

The MME network elements 212 that are configured for MBMS establish their transport network layer connectivity over the M3 interface. The MME network elements 212 becomes aware of the serving areas the eNBs belong to during the M3 setup. The BM-SC network element 208 creates one or more MBMS bearer contexts, stores corresponding session attributes and, for multicast service, allocates multicast group IP addresses to be sent directly via the MME network elements 212 to one or more subtending eNBs 202 for them to join the LTE-broadcast/multicast session. Upon establishing the MBMS session successfully, the eNBs can send an IGMPv3/MLDv2 PIM group JOIN message to their respective serving BM-SC network elements 208 for user data. In some embodiments, LTE networks provide multiple MMEs 212 serving a given region. This is often referred to as pooling, in which the MMEs 212 serve a common region or area. When one of the MME in such a pool fails to respond, the BM-SC serving that pool area can send the MBMS session to a second MME in that pool in a round robin manner upon exhausting the standard GTP retransmission mechanisms on the GTPv2-C Sm interface.

The BM-SC 208 initiates a session start request towards the MME 212 to indicate the impending start of user data corresponding to a specific broadcast and/or multicast user service. In particular, the session start request is provided on a Sm, GTPv2-C based interface of an LTE core network. The MME 212 responds to the BM-SC 208 with session response. The BM-SC 208 then sends the session start request to the MME 212 of the LTE core network on the Sm, GTPv2-C based interface. The MME 212 then sends the session start request to an E-UTRAN node, e.g., an eNB 202 on an M3, Stream Control Transmission Protocol (SCTP) based interface. The eNB 202 sends the session start response to the MME 212, which sends it to the BM-SC 208. Once the session has been established, the BM-SC 208 initiates a transfer of data directly to the eNB 202 over an M1, GTP v1-U interface. Namely, data packets are sent between the BM-SC 208 and the eNB 202 by way of a direct tunnel.

Each instance of a GTP can be mapped to a "bearer" (e.g., a default bearer or dedicated bearer). The GTP v2-C protocol is used in control plane applications, e.g., for core network specific signaling (bearer activation (creation), deletion, modification, etc.), and uses UDP as transport protocol. The GTP v2-C protocol is described in 3GPP TS 29.274, incorporated herein by reference in its entirety. The GTP v1-U protocol is used in user plane applications, e.g., between core network elements and eNBs. The GTP v1-U protocol can be used in user plane to carry user data traffic, and also uses UDP as transport protocol. The GTP v1-U protocol is described in 3GPP TS 29.281, incorporated herein by reference in its entirety.

In an encapsulation of UE user plane traffic, the UE creates IP/TCP packet having data by application, including source address of the UE and a destination address of an application server, e.g., Facebook®. The eNB receives IP packets from the UEs over an air interface and puts the IP packets into the GTP Packet payload parts. The GTP packet header includes the information related to tunnel IDs, which are used to multiplex and de-multiplex GTP packets from different GTP tunnels onto the same GTP path. More than one tunnel can be established between the same two GTP endpoints, with each tunnel differentiated according to a respective tunnel ID.

There are two layers of control plane messaging with two different interfaces and protocol types used in establishing the MBMS session start request from the BM-SC 208 to the eNBs 202. This represents a simplification of both layers of control plane messaging and interfaces over the reference architecture 100 of FIG. 1. Upon successful establishment of the mobile user service and radio resource allocation, the eNB 202 can join the transport network IP multicast address to receive the user data from the BM-SC 208.

In some embodiments, the BM-SC 208 receives data for forwarding by way of the mobile user service from an external content source 218. Alternatively or in addition, the BM-SC 208 receives data for forwarding by way of the mobile user service from another content source 216, by way of the S/PDN-GW 214. One or more BM-SC network elements 208 can be deployed in a centralized or distributed configuration similar to the MMEs 212, e.g., in regional data centers and can perform one or more of the MBMS Session Start, Session Update and Session Stop procedures directly with the MMEs 212 resulting in enhanced control plane behavior.

In operation, an MBMS user service announcement allows users to request or be informed about the range of MBMS user services available. A service announcement is used to distribute to users information about the service, parameters required for service activation (e.g., IP multicast address(es)) and possibly other service related parameters (e.g., service start time).

MBMS user service announcements can be sent by one of several service discovery mechanisms, such as standard Short Message Service (SMS). The method chosen to inform users about MBMS user services may have to account for the UE's location, (e.g., current cell). By way of illustrative example, MBMS user service announcement mechanisms can include one or more of an SMS cell broadcast to advertise MBMS Multicast and Broadcast user services, MBMS Broadcast mode to advertise MBMS Multicast and Broadcast user services, MBMS Multicast mode to advertise MBMS Multicast user Services. Alternatively or in addition, MBMS user service announcements can include one or more of a "push" mechanism (e.g., WAP, SMS-PP, MMS) and or a "pull" (e.g., HTTP, FTP).

An MBMS multicast user service may require a multicast activation by the user. Such activation can include a "joining" process by which a subscriber joins (becomes a member of) a multicast group, i.e., the user indicates to the network that he/she wants to receive Multicast mode data of a specific MBMS bearer service.

It is understood that in at least some instances, an MBMS user service can be carried by more than one MBMS bearer services. In such multi-bearer applications, an MBMS user service part in the UE initiates a relevant MBMS bearer services to receive the service. A session start is a point at which the BM-SC 208 is ready to send data. This can be identified with the start of a "Multicast session." Session Start is the trigger for bearer resource establishment for MBMS data transfer. If an MBMS user service is carried by more than one MBMS bearer service, a session start message is sent for each MBMS bearer service. In that case the UE may need to initiate the reception of multiple relevant MBMS bearer services to receive the MBMS user service.

An MBMS notification can be provided to informs the UEs 204 about forthcoming (and potentially about ongoing) MBMS multicast data transfer. Data transfer refers to a phase during which MBMS data are transferred to the UEs 204.

A Session Stop is a point at which the BM-SC 208 determines that there will be no more data to send for some period of time—this period being long enough to justify removal of bearer resources associated with the session. At Session Stop, any bearer resources can be released.

There are a wide variety of business cases for operators around the globe utilizing such a high-speed mobility based broadcast solution. These may vary from one operator to another depending on their network ecosystem. By way of non-limiting example, the embodiments disclosed herein can be used for broadcast and/or multicast of standard service provider offerings, such as electronic programming guides, regularly scheduled programming, e.g., network programming, live programming Service regions can include, without restriction, national, regional and/or local broadcasts/multicasts. It is also envisioned that service can be provided to one or more venues, such as arenas, stadiums, theaters, businesses, college campuses, and the like. In at least some embodiments, the BM-SC network entity 208 has access to a database or similar provisioning repository. The BM-SC 208 can identify a MBMS target distribution region, e.g., from a data service request. The BM-SC 208 can access the provisioning database and/or mapping server to associate core network elements and/or radio access nodes servicing the target distribution region. The techniques disclosed herein can be used to establish a point-to-multipoint data delivery service by way of one or more BM-SCs 208, based on the corresponding core network elements and/or radio access nodes.

In some embodiments, data delivered by the MBMS service is streaming data, as in streaming video (e.g., MPEG), streaming audio (e.g., MP3) and the like. Streaming data can include, without limitation, one or more of SD, HD and Ultra HD, e.g., 4K TV format. Alternatively or in addition, the data is non-streaming data, e.g., data files. Such non-streaming data can include, without limitation, programs files, e.g., operating systems and/or applications, updates to operating systems and/or applications, antivirus software and/or supporting files, image files, text files, and so on.

The LTE-B core network elements (including one or more of the BM-SC 208, the S/PDN-GW 214 and the MME 212) can be deployed in a centralized or distributed architecture in data centers to serve a given LTE broadcast service area. These network elements create the MBMS bearer context upon reception of the session start request message and store the MBMS session attributes in the bearer context.

Figure 3:
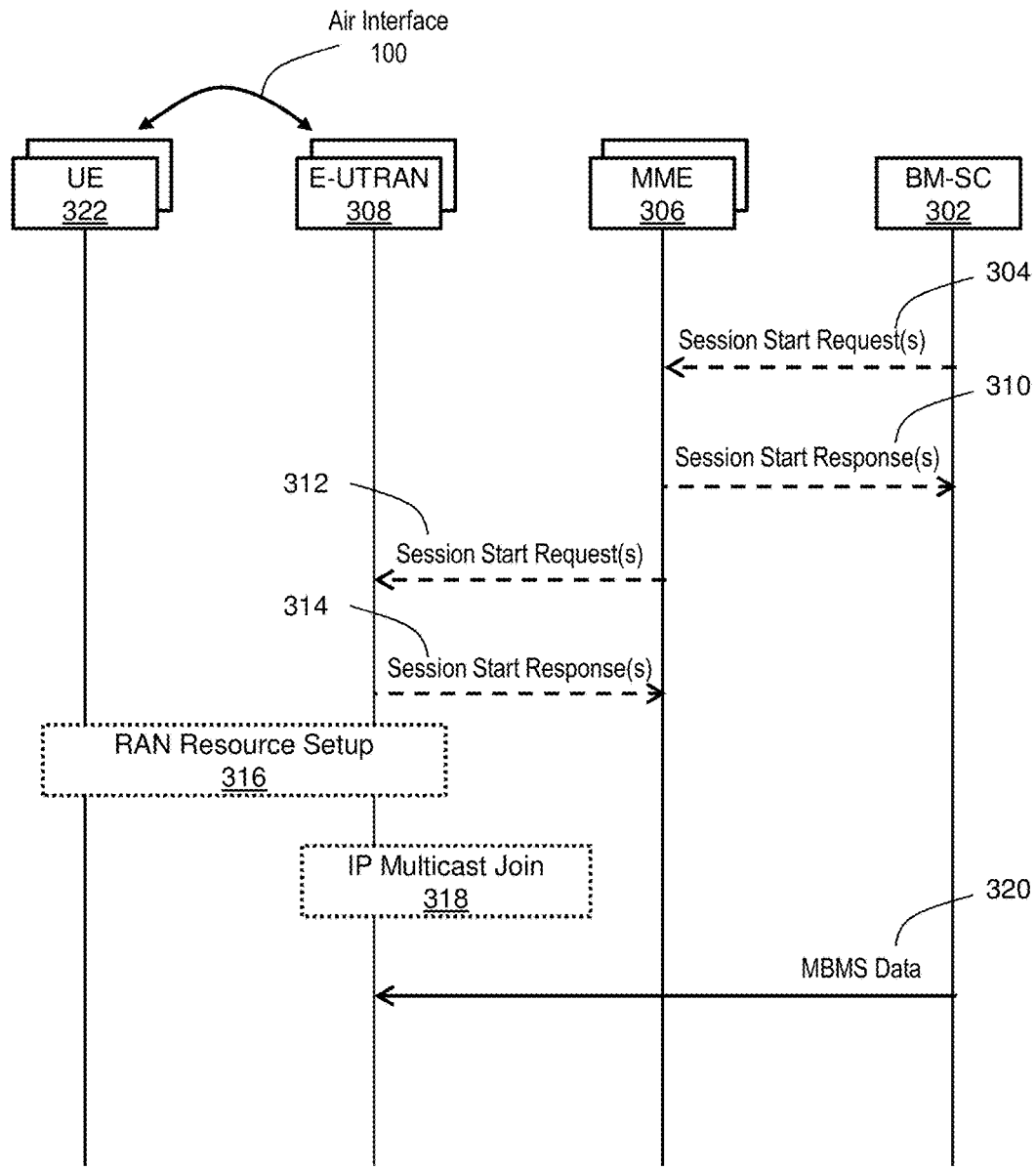
FIG. 3 depicts an illustrative embodiment of a session start procedure used in portions of the system described in FIG. 2.

Referring next to FIG. 3 an illustrative embodiment of a session start procedure 300 used in portions of the system described in FIG. 2 is depicted. A BM-SC 302 sends a Session Start Request message 304 to an MME 306 to indicate an impending start of a transmission. In some embodiments, the Session Start Request message 304 includes one or more session attributes, e.g., TMGI, Flow Identifier, QoS, MBMS service Area, Session identifier, estimated session duration, time to MBMS data transfer, MBMS data transfer start, access indicator. In some embodiments, the Session Start Request message 304 is sent to multiple MMEs identified in a list of MBMS control plane nodes (MMEs). The Session Start Request message 304 is sent to the MME 306 listed in a "downstream nodes" parameter of a corresponding MBMS Bearer Context in the BM-SC 302. In some embodiments, the BM-SC 302 starts multiple bearer sessions for the same MBMS bearer service (identified by the TMGI) but with different content. If so, a Flow Identifier is included in the Session Start Request to identify the different sub-sessions and the associated MBMS Service Areas shall not overlap.

The MMEs 306 respond with Session Start Response messages 310 with information for the BM-SC 302 to send MBMS data to one more nodes of the radio access network (E-UTRAN) 308. In some embodiments, the BM-SC 302 creates an MBMS bearer context. The BM-SC 302 stores session attributes and a list of MBMS control plane nodes, e.g., MMEs 306, in the MBMS bearer context and allocates a transport network IP multicast address or, optionally, for E-UTRAN access.

Each MME 306 creates a respective MBMS bearer context. Each MME 306 stores the session attributes and sends a Session Start Request message 312 including the session attributes (TMGI, QoS, MBMS service Area, Session identifier, estimated session duration, broadcast (for UTRAN only), transport network IP Multicast Address, IP address of the multicast source, C-TEID, . . . ) to the E-UTRAN nodes 308.

If one or more of the downstream E-UTRAN nodes 308 of an MME 306 accepts the Session Start request message 312 with the proposed IP Multicast and Source addresses, the E-UTRAN 308 responds to the MME 306, e.g., in a session start response message 314, confirming the reception of the Session Start Request message 312. The E-UTRAN 308 creates an MBMS bearer context by storing the session attributes. The MME 306 sends the MBMS Session Start Response message 310 to the BM-SC 302 including an indication that the IP Multicast distribution is accepted.

The MME 306 can store the session attributes and the identifier of the E-UTRAN nodes or eNBs 308 as a "list of downstream nodes" parameter in its MBMS Bearer Context and responds to the BM-SC 302. The MME 306 may return an MBMS Session Start Response 310 to the BM-SC 302 as soon as the session request is accepted by one E-UTRAN node 308. The E-UTRAN node 308 establishes the necessary radio resources for the transfer of MBMS data to the interested UEs 322 according to a radio resource set up procedure 316. If the E-UTRAN node 308 accepts the IP Multicast distribution, it joins the appropriate transport network IP multicast address (including the IP address of the multicast source) allocated by the BM-SC 302 according to an IP multicast join procedure 318, to enable reception of MBMS data.

The BM-SC 302 initiates IP Multicast distribution and/or point-to-point MBMS bearers depending on the responses from the MMEs 306, sending MBMS data 320 directly to the E-UTRAN nodes 308. As the MBMS data 320 is sent directly to the E-UTRAN nodes 308, it can be referred to as tunneling, e.g., a direct tunnel between the BM-SC 302 and each of the E-UTRAN nodes 308. The BM-SC 302 receives MBMS data and sends the MBMS data using IP multicast distribution towards all joined eNodeB nodes 308.

The session start procedure 300 provides an illustrative example of how the embodiments disclosed herein support typical MBMS signaling and/or data exchange in an LTE network. It should be understood that the embodiments disclosed herein support other LTE signaling and/or data exchange, including without limitation, MBMS service provisioning (multicast and/or broadcast service), service announcements, data transfers, session update, session stop, leaving or deactivation, and the like.

Figure 4A:
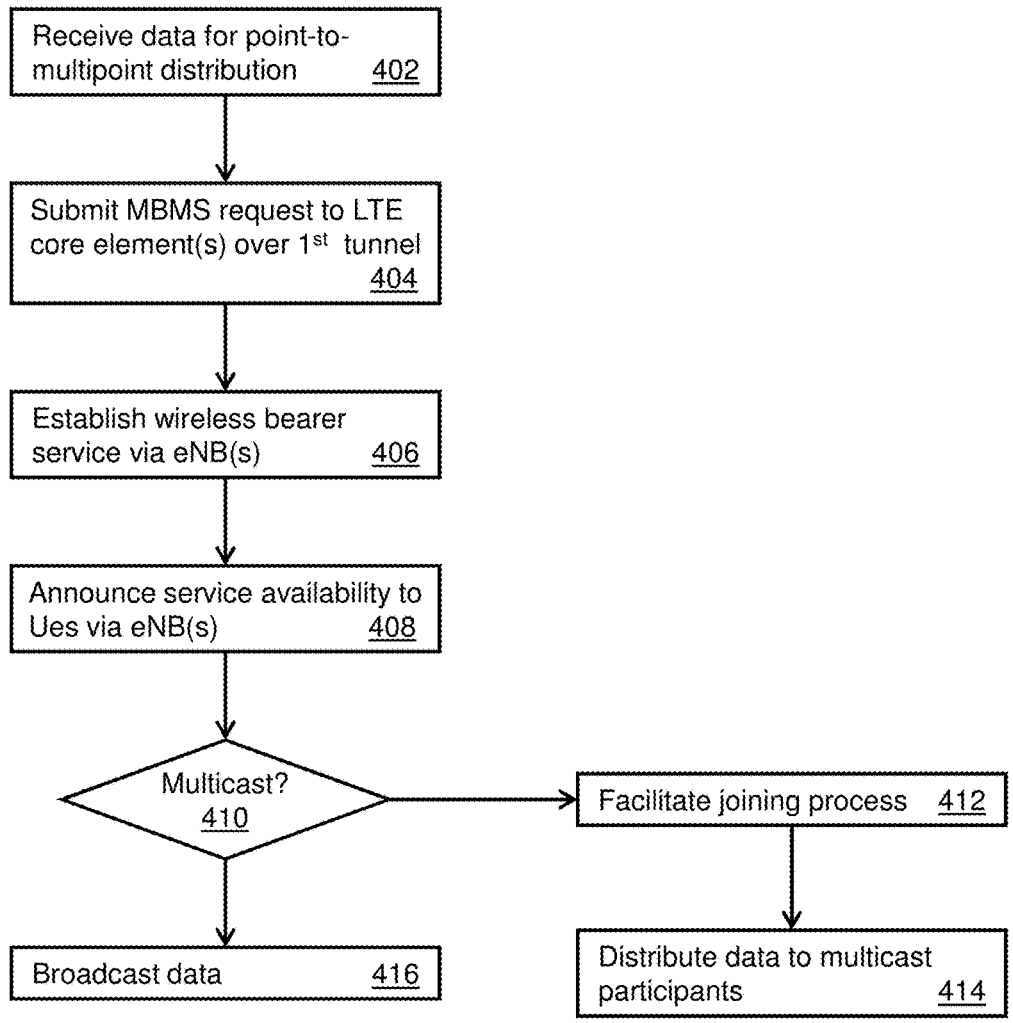
FIG. 4A depicts an illustrative embodiment of a process used in portions of the system described in FIG. 2.

Referring next to FIG. 4A, an illustrative embodiment of a process 400 used in portions of the system described in FIG. 2 is depicted. Receive data for point-to-multipoint distribution at 402. Submit MBMS request to LTE core element(s) over a first tunnel at 404. Establish wireless bearer service via eNB(s) at 406. Announce service availability to UEs via eNB(s) at 408. In at least some embodiments, video stream (multicast user data) is custom provisioned for a specific serving area. Determine whether the service is a multicast service at 410. To the extent that the service is a multicast service, initiate a joining process at 412. Distribute the data to multicast participants at 414. To the extent that the service is not a multicast service, e.g., it is a broadcast service, the broadcast data is distributed to UEs at 416.

Figure 4B:
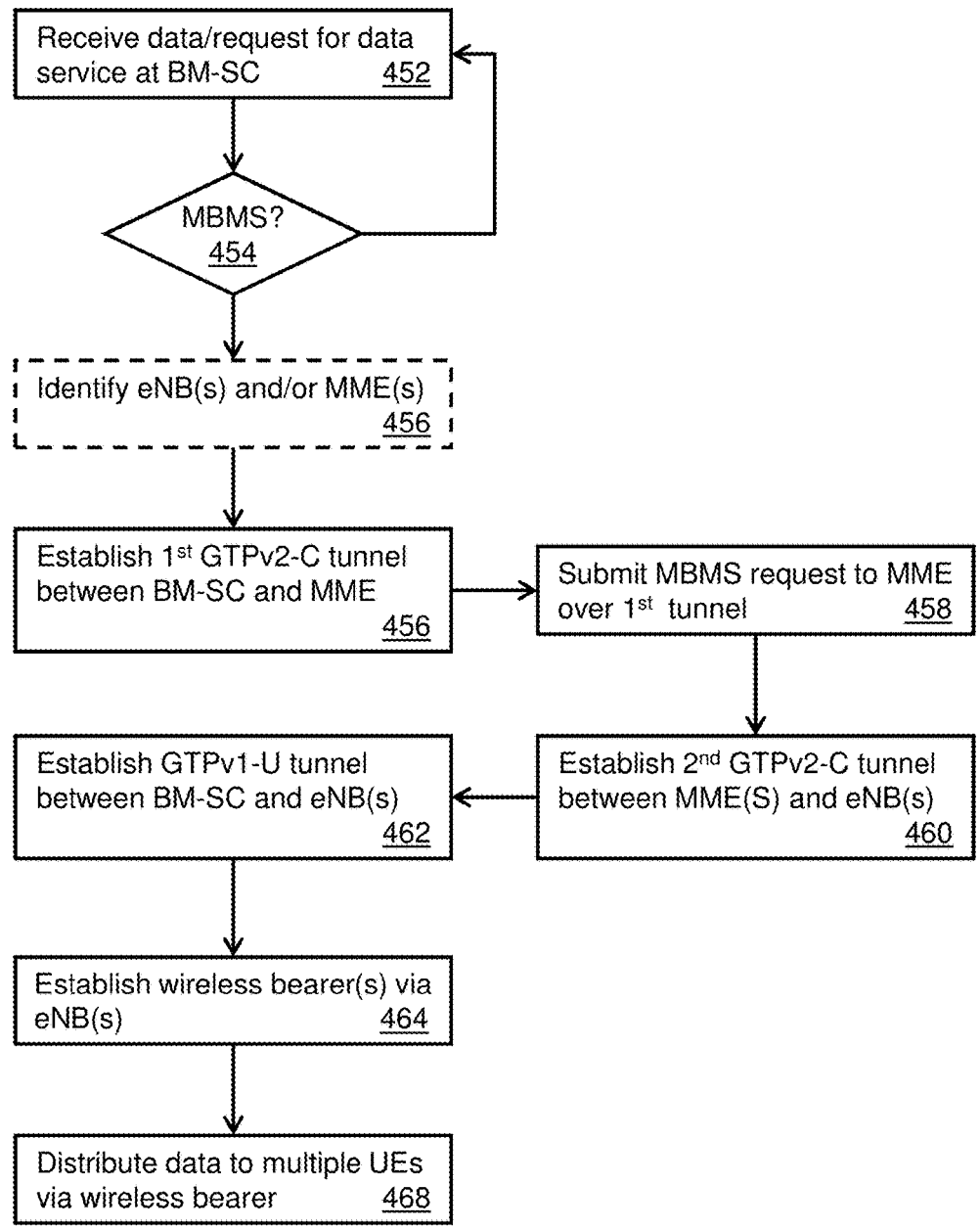
FIG. 4B depicts an illustrative embodiment of a process used in portions of the system described in FIG. 2.

FIG. 4B depicts an illustrative embodiment of a process 450 used in portions of the system described in FIG. 2. Receive data/request for data service at BM-SC at 452. Determine whether the data service is an MBMS service at 454. To the extent that the service is an MBMS service, establish a first GTPv2-C tunnel between BM-SC and MME at 456. Submit MBMS request to MME over the first tunnel at 458. Establish a second GTPv2-C tunnel between MME(s) and eNB(s) at 460. Establish GTP v1-U tunnel between BM-SC and eNB(s) 462. Establish wireless bearer(s) via eNB(s) at 464. Distribute data to multiple UEs via wireless bearer at 468.

Figure 5:
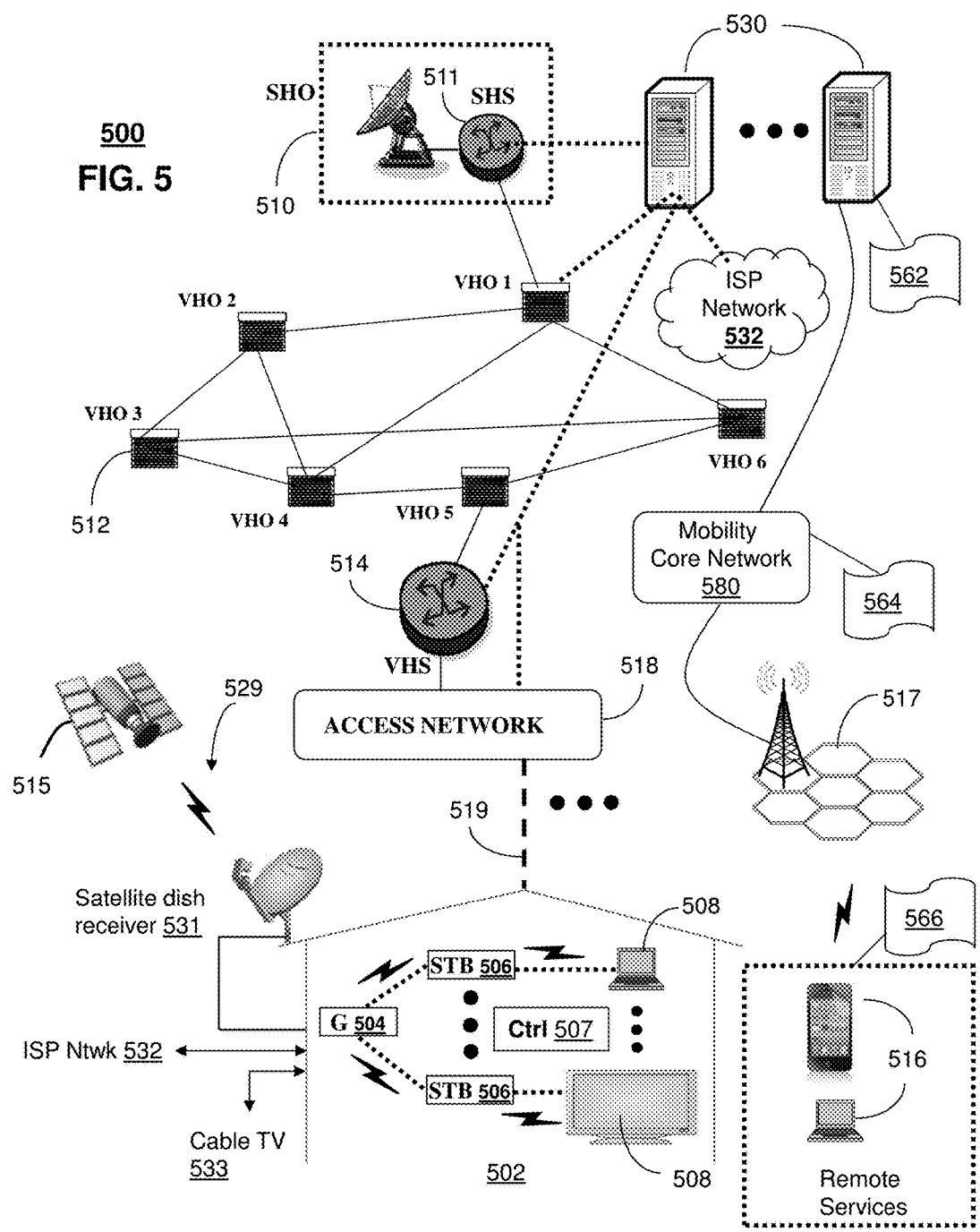
FIG. 5 depicts an illustrative embodiment of communication system that provide media services including the point-to-multipoint services of FIGS. 2-3.

Referring to FIG. 5 an illustrative embodiment of a first communication system 500 is depicted for delivering media content. The communication system 500 can represent an Internet Protocol Television (IPTV) media system. Communication system 500 can be overlaid or operably coupled with point-to-multipoint distribution system 200 of FIG. 2 as another representative embodiment of communication system 500. For instance, one or more devices illustrated in the communication system 500 of FIG. 5 receive data for distribution to a multiple mobile devices via a mobile user service. A request is sent to a mobility management entity over a control signaling interface to establish a wireless bearer service. The wireless bearer service can be used to wirelessly distribute the data to the multiple mobile devices via a radio access node. A confirmation is received of the establishment of the wireless bearer service, and the mobile user service is announced over the wireless bearer service. The data is forwarded to the radio access node via a wireless terrestrial bearer of the wireless bearer service, wherein the radio access node wirelessly distributes the data to the plurality of mobile devices via the mobile user service over a common radio channel.

The IPTV media system can include a super head-end office (SHO) 510 with at least one super headend office server (SHS) 511 which receives media content from satellite and/or terrestrial communication systems. In the present context, media content can represent, for example, audio content, moving image content such as 2D or 3D videos, video games, virtual reality content, still image content, and combinations thereof. The SHS server 511 can forward packets associated with the media content to one or more video head-end servers (VHS) 514 via a network of video head-end offices (VHO) 512 according to a multicast communication protocol.

The VHS 514 can distribute multimedia broadcast content via an access network 518 to commercial and/or residential buildings 502 housing a gateway 504 (such as a residential or commercial gateway). The access network 518 can represent a group of digital subscriber line access multiplexers (DSLAMs) located in a central office or a service area interface that provide broadband services over fiber optical links or copper twisted pairs 519 to buildings 502. The gateway 504 can use communication technology to distribute broadcast signals to media processors 506 such as Set-Top Boxes (STBs) which in turn present broadcast channels to media devices 508 such as computers or television sets managed in some instances by a media controller 507 (such as an infrared or RF remote controller).

The gateway 504, the media processors 506, and media devices 508 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 506 and subsystems of the IPTV media system for services such as video-on-demand (VoD), browsing an electronic programming guide (EPG), or other infrastructure services.

A satellite broadcast television system 529 can be used in the media system of FIG. 5. The satellite broadcast television system can be overlaid, operably coupled with, or replace the IPTV system as another representative embodiment of communication system 500. In this embodiment, signals transmitted by a satellite 515 that include media content can be received by a satellite dish receiver 531 coupled to the building 502. Modulated signals received by the satellite dish receiver 531 can be transferred to the media processors 506 for demodulating, decoding, encoding, and/or distributing broadcast channels to the media devices 508. The media processors 506 can be equipped with a broadband port to an Internet Service Provider (ISP) network 532 to enable interactive services such as VoD and EPG as described above.

In yet another embodiment, an analog or digital cable broadcast distribution system such as cable TV system 533 can be overlaid, operably coupled with, or replace the IPTV system and/or the satellite TV system as another representative embodiment of communication system 500. In this embodiment, the cable TV system 533 can also provide Internet, telephony, and interactive media services. System 500 enables various types of interactive television and/or services including IPTV, cable and/or satellite. The subject disclosure can apply to other present or next generation over-the-air and/or landline media content services system.

Some of the network elements of the IPTV media system can be coupled to one or more computing devices 530, a portion of which can operate as a web server for providing web portal services over the ISP network 532 to wireline media devices 508 or wireless communication devices 516.

Communication system 500 can also provide for all or a portion of the computing devices 530 to function as a broadcast-multicast service center (herein referred to as BM-SC 530). The BM-SC 530 can use computing and communication technology to perform function 562, which can include among other things, the point-to-multi point service techniques described by the process 400 of FIG. 4A and/or the process 450 of FIG. 4B. For instance, the function 562 of the BM-SC 530 can be similar to the functions described for the BM-SC 208 of FIG. 2 in accordance with process 400 and/or process 450. One or more nodes of a mobility core network 580 and wireless communication devices 516 can be provisioned with software functions 564 and 566, respectively, to utilize the services of the BM-SC 530. For instance, the function 564 of the mobility core network 506 can be similar to the functions described for the BM-SC 208, the MME 212, and/or the eNB 202 of FIG. 2 in accordance with the process 400 of FIG. 4A and/or the process 450 of FIG. 4B. Likewise, the function 566 of wireless communication devices 516 can be similar to the functions described for the communication devices 204 of FIG. 2 in accordance with the process 400 of FIG. 4A and/or the process 450 of FIG. 4B.

Multiple forms of media services can be offered to media devices over landline technologies such as those described above. Additionally, media services can be offered to media devices by way of a wireless access base station 517 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 6:
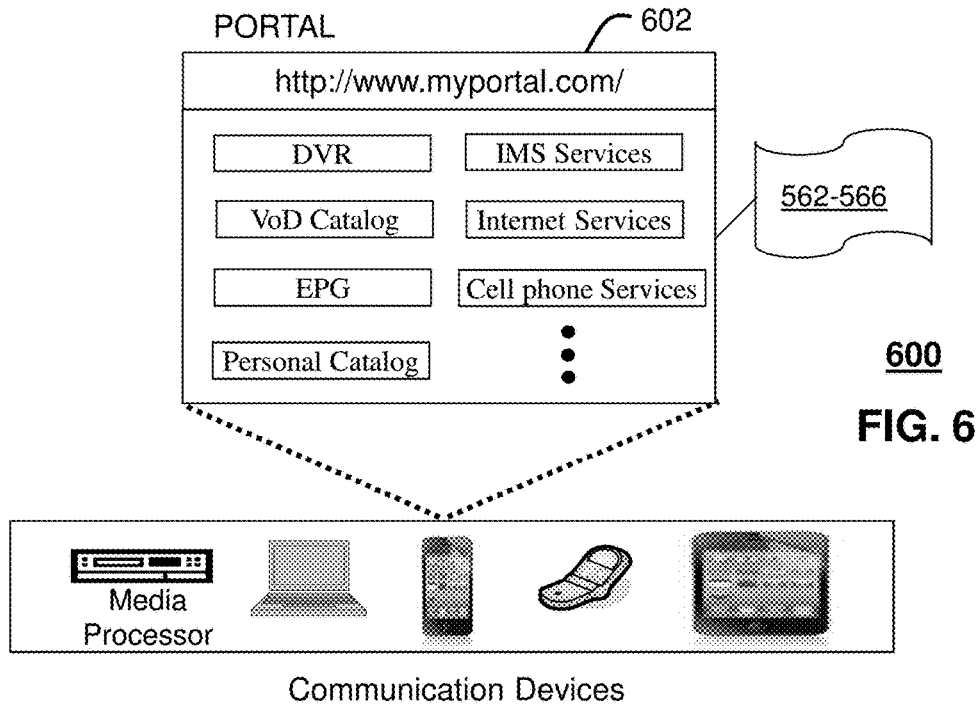
FIG. 6 depicts an illustrative embodiment of a web portal for interacting with the communication systems of FIGS. 2 and 5.

FIG. 6 depicts an illustrative embodiment of a web portal 602 of a communication system 600. Communication system 600 can be overlaid or operably coupled with systems 200 of FIG. 2, communication system 500, and/or communication system 500 as another representative embodiment of systems 200 of FIG. 2, communication system 500, and/or communication system 500. The web portal 602 can be used for managing services of the system 200 of FIG. 2 and communication system 500. A web page of the web portal 602 can be accessed by a Uniform Resource Locator (URL) with an Internet browser using an Internet-capable communication device such as those described in FIG. 2 and FIG. 5. The web portal 602 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 602 can also be used for provisioning IMS services described earlier, provisioning Internet services, provisioning cellular phone services, and so on.

The web portal 602 can further be utilized to manage and provision one or more of the software applications 562-566 to adapt these applications as may be desired by subscribers and/or service providers of the system 200 of FIG. 2, and the communication system 500 of FIG. 5. For instance, users of the services provided by network element 208 or BM-SC 530 can log into their on-line accounts and provision the servers 208 or server 530 with information, such as programs and/or files to be distributed, coverage areas, corresponding radio access nodes and/or MME network elements, a service type, e.g., broadcast, multicast, access and/or authorization restrictions, e.g., encryption key distribution and/or management, multicast recipients, billing, advertisers, and the like. Users can log into their on-line accounts and provision the servers 208 or server 530 with information, such as, contact information to server to enable it to communication with devices described in FIGS. 2 and 5, and so on. Users can be one or more of content providers, advertisers, service providers, individuals, and the like. Service providers can log onto an administrator account to provision, monitor and/or maintain the system 200 of FIG. 2 or server 430.

Figure 7:
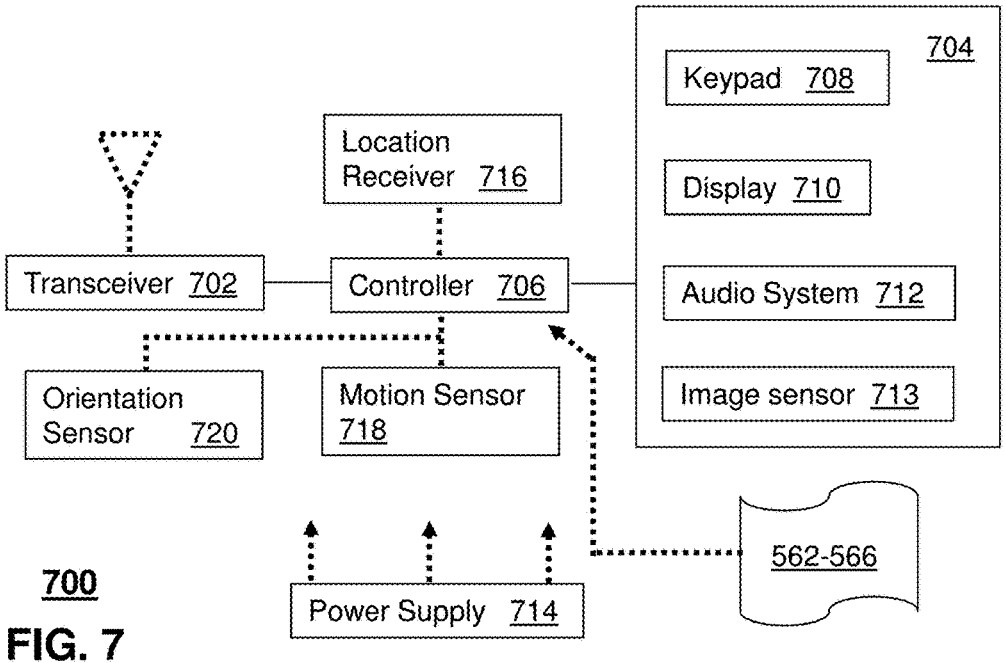
FIG. 7 depicts an illustrative embodiment of a communication device.

FIG. 7 depicts an illustrative embodiment of a communication device 700. Communication device 700 can serve in whole or in part as an illustrative embodiment of the devices depicted in FIG. 2, and FIG. 5 and can be configured to perform portions of the processes 400 of FIG. 4A and 450 of FIG. 4B.

Communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth®. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 700 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of devices of FIGS. 1 and/or 2, the media processor 406, the media devices 408, or the portable communication devices 416 of FIG. 4, as well as the IMS CDs 501-502 and PSTN CDs 503-505 of FIG. 5. It will be appreciated that the communication device 700 can also represent other devices that can operate in systems of FIGS. 1 and/or 2, communication systems 400-500 of FIGS. 4-5 such as a gaming console and a media player. In addition, the controller 706 can be adapted in various embodiments to perform the functions 562-566, respectively.

The embodiments disclosed herein provide simplified IP mobility core network architecture, interfaces, IP addressing, routing and topology design. Further advantages offer a smoother segregation of control plane and user plane broadcast traffic in LTE network architectures. In particular, the direct tunnel for multicast/broadcast provides optimized user data transport, e.g., by reducing system architecture complexity, control and data processing time and in at least some instances message traffic. The embodiments offer incremental enhancements to existing MME and eNB network elements functionality. Multicast/broadcast service can be provided to mobile user equipment in manner compliant with applicable LTE standards, without requiring an MBMS-GW. Such architectural simplifications result in capital expenditure savings as there is no need to invest in a new MBMS-GW network element. Likewise, the disclosed embodiments result in significant operational expenditure savings as there is no need to install, commission and maintain a new MBMS-GW network element. It is believed that the direct tunnel for multicast/broadcast techniques disclosed herein also enhance core network reliability and availability.

Upon reviewing the aforementioned embodiments, it would be evident to an artisan with ordinary skill in the art that said embodiments can be modified, reduced, or enhanced without departing from the scope of the claims described below. For example, although the embodiments disclosed herein relate to LTE network applications, it is envisioned that the disclosure can be applied to other networks, such as GPRS applications. The BM-SC network elements can be in communication with other BM-SC network elements to disseminate data in a parallel fashion. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
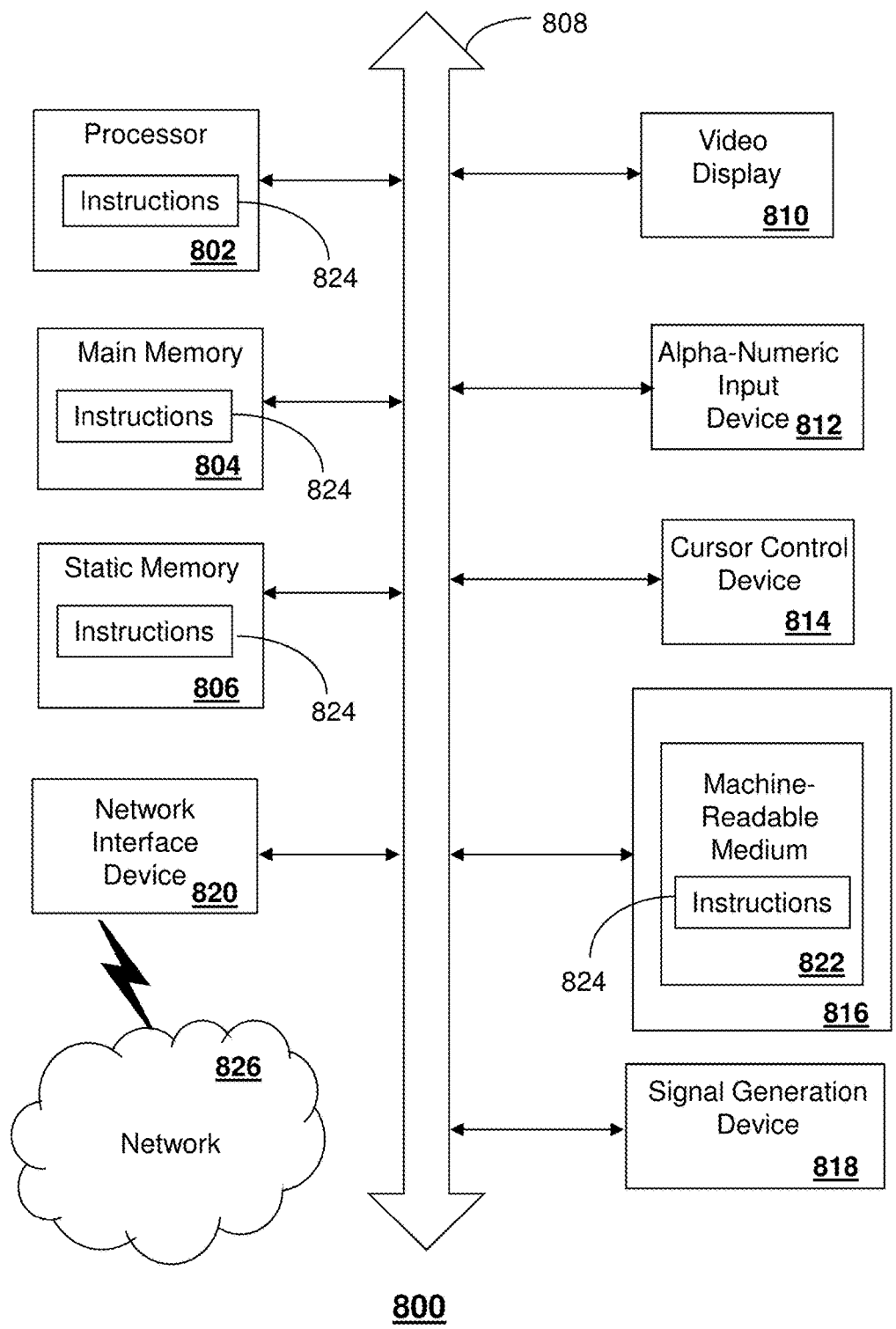
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the BM-SC 530, the media processor 506, the MME 212, the eNB 202, the S/PDN-GW 214 and other devices of FIGS. 1 and 5. In some embodiments, the machine may be connected (e.g., using a network) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU)), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display). The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 800.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations," this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
   a processor; and
   a memory that stores executable instructions that, when executed by the processor, facilitate performance of operations, the operations comprising:
   receiving data for distribution to a plurality of mobile devices, wherein the distribution is via a mobile user service;
   sending a request to a mobility management entity over a control signaling interface for establishment of a wireless bearer service to wirelessly distribute the data to the plurality of mobile devices via a radio access node, wherein the sending of the request over the control signaling interface is accomplished without using an SGmb interface defined according to a Third Generation Partnership Protocol, Long-Term Evolution architecture (3GPP-LTE);
   receiving a confirmation of the establishment of the wireless bearer service;
   announcing the mobile user service over the wireless bearer service; and
   forwarding the data to the radio access node via a wireless terrestrial bearer of the wireless bearer service, wherein the radio access node wirelessly distributes the data to the plurality of mobile devices via the mobile user service over a common radio channel.

2. The device of claim 1, wherein the forwarding of the data comprises forwarding multimedia broadcast/multicast service data to the radio access node via a defined data service interface between the device and the radio access node.

3. The device of claim 2, wherein the forwarding of the multimedia broadcast/multicast service data to the radio access node is accomplished without using an SGi-mb interface defined according to the 3GPP-LTE.

4. The device of claim 1, wherein the data comprises a multimedia broadcast/multicast service, and wherein the radio access node bears the multimedia broadcast/multicast service on an air interface.

5. The device of claim 1, wherein the operations further comprise registering the plurality of mobile devices for access to the data via the mobile user service.

6. The device of claim 5, wherein the registering of the plurality of mobile devices comprises:
   receiving an activation request from a mobile device of the plurality of mobile devices;
   authenticating the mobile device to obtain an authenticated mobile device; and
   sending a key to the authenticated mobile device, wherein the authenticated mobile device accesses the data of the mobile user service by way of the key.

7. The device of claim 1, wherein the operations further comprise:

establishing a control signaling General Packet Radio Service Tunneling Protocol (GTP) tunnel with the mobility management entity; and establishing a user data GTP tunnel with the radio access node, wherein the forwarding of the data occurs via the user data GTP tunnel.

8. The device of claim 1, wherein the operations further comprise:

identifying a plurality of core network elements, wherein the mobility management entity is one of the plurality of core network elements;

sending another request to another core network element of the plurality of core network elements over the control signaling interface for establishment of another wireless bearer service to wirelessly distribute the data to another plurality of mobile devices via another radio access node; and forwarding the data to the another radio access node via another wireless bearer of the another wireless bearer service.

9. A method, comprising:

receiving, by a system comprising a processor, data for distribution to a plurality of mobile devices, wherein the distribution is via a data dissemination service;

sending, by the system, a request to a core network node over a control signaling interface for establishment of a wireless bearer service to wirelessly distribute the data to the plurality of mobile devices via a radio access node;

determining, by the system, a confirmation of the establishment of the wireless bearer service; and forwarding, by the system, the data to the radio access node via a wireless terrestrial bearer of the wireless bearer service, wherein the radio access node wirelessly distributes the data to the plurality of mobile devices via the data dissemination service over a common radio channel, wherein the forwarding of the data comprises forwarding multimedia broadcast/multicast service data to the radio access node, and wherein the forwarding of the multimedia broadcast/multicast service data to the radio access node is accomplished without using an SGi-mb interface defined according to a Third Generation Partnership Protocol, Long-Term Evolution architecture (3GPP-LTE).

10. The method of claim 9, wherein the forwarding of the multimedia broadcast/multicast service data to the radio access node comprises sending via a defined data service interface between the system and the radio access node.

11. The method of claim 10, wherein the sending of the request over the control signaling interface is accomplished without using an SGmb interface defined according to the 3GPP-LTE.

12. The method of claim 9, further comprising:

establishing, by the system, a control signaling General Packet Radio Service Tunneling Protocol (GTP) tunnel with the core network node; and establishing, by the system, a user data GTP tunnel with the radio access node, wherein the forwarding of the data occurs via the user data GTP tunnel.

13. The method of claim 9, further comprising:

identifying, by the system, a plurality of network nodes, wherein the core network node is one of the plurality of network nodes;

sending, by the system, a request to another core network node of the plurality of network nodes over the control signaling interface for establishment of another wireless bearer service to wirelessly distribute the data to another plurality of mobile devices via another radio access node; and forwarding the data to the another radio access node via another wireless terrestrial bearer of another wireless bearer service.

14. The method of claim 9, further comprising registering, by the system, the plurality of mobile devices for access to the data dissemination service.

15. The method of claim 14, wherein the registering of the plurality of mobile devices comprises:

receiving, by the system, an activation request from a mobile device of the plurality of mobile devices;

authenticating, by the system, the mobile device to obtain an authenticated mobile device; and sending, by the system, a key to the authenticated mobile device, wherein the authenticated mobile device accesses the data of the data dissemination service by way of the key.

16. A non-transitory machine-readable storage medium; comprising executable instructions that, when executed by a processor, facilitate performance of operations, the operations comprising:

receiving data for distribution to a plurality of mobile devices;

identifying a plurality of network control nodes;

sending a request to a first network control node over a control signaling interface for establishment of a wireless bearer service to wirelessly distribute the data to the plurality of mobile devices via a radio access node, wherein the first network control node is one of the plurality of network control nodes;

receiving a confirmation of the establishment of the wireless bearer service;

forwarding the data to the radio access node via a wireless terrestrial bearer, wherein the radio access node wirelessly distributes the data to the plurality of mobile devices over a common radio channel; and sending another request to another network control node of the plurality of network control nodes over the control signaling interface for facilitating establishment of another wireless bearer service to wirelessly distribute the data to another plurality of mobile devices via another radio access node.

17. The non-transitory machine-readable storage medium of claim 16, wherein the forwarding of the data comprises forwarding multimedia broadcast/multicast service data to the radio access node via a defined data service interface between the processor and the radio access node.

18. The non-transitory machine-readable storage medium of claim 17, wherein the sending of the request to the first network control node over the control signaling interface is accomplished without using an SGmb interface defined according to a Third Generation Partnership Protocol, Long-Term Evolution architecture (3GPP-LTE), and wherein the forwarding of the multimedia broadcast/multicast service data to the radio access node is accomplished without using an SGi-mb interface defined according to the 3GPP-LTE.

19. The non-transitory machine-readable storage medium of claim 16, wherein the operations further comprise:

forwarding the data to the another radio access node via another wireless terrestrial bearer of the another wireless bearer service.

20. The non-transitory machine-readable storage medium of claim 16, wherein the data comprises a multimedia broadcast/multicast service, and wherein the radio access node bears the multimedia broadcast/multicast service on an air interface.

\* \* \* \* \*